United States Patent [19]
Hsiao

[11] Patent Number: 5,458,053
[45] Date of Patent: Oct. 17, 1995

[54] BARBECUE GRILL

[76] Inventor: Yung-Fang Hsiao, No.1, Lane 756, Chu Kuang Rd., Ho Ping Li, Yuan Lin Town, Chang Hua Hsien, Taiwan

[21] Appl. No.: 266,372

[22] Filed: Jun. 27, 1994

[51] Int. Cl.⁶ .................. A47J 37/07; F24C 1/16
[52] U.S. Cl. .................. 99/444; 99/449; 99/450; 126/25 A; 126/9 R
[58] Field of Search .................. 99/375, 444–446, 99/400, 408, 425, 449, 450, 482; 126/25 R, 25 A, 9 R, 9 B, 337 A, 30

[56] References Cited

U.S. PATENT DOCUMENTS

| | | | |
|---|---|---|---|
| 1,986,035 | 1/1935 | Wells | 126/25 A |
| 2,967,023 | 1/1961 | Huckabee | 99/482 |
| 3,828,759 | 8/1974 | Cooper | 126/9 R |
| 3,834,370 | 9/1974 | Nelson | 126/30 |
| 4,548,193 | 10/1985 | Marogil | 126/9 R |
| 4,622,945 | 11/1986 | Glitten | 126/25 A |
| 4,683,867 | 8/1987 | Beatty | 99/444 |
| 4,909,137 | 3/1990 | Brugnoli | 99/444 |
| 5,099,821 | 3/1992 | Ceravalo | 126/25 R |
| 5,179,932 | 1/1993 | DeCarlo | 99/450 |
| 5,279,277 | 1/1994 | Barker | 99/444 |

*Primary Examiner*—Timothy F. Simone

[57] ABSTRACT

A barbecue grill including a lifting mechanism controlled to lift the cooking grid thereof, the lifting mechanism including a transmission rod having two reversed worms and driven by a crank handle, two driven gear wheels respectively meshed with the reversed worms and having a respective coupling hole at the center, and two links each having one end fixedly fastened to said coupling of either worm gear and an opposite end pivoted to either side of said cooking grid respectively.

3 Claims, 5 Drawing Sheets

BARBECUE GRILL

BACKGROUND OF THE INVENTION

The present invention relates to barbecue grills, and relates more particularly to a cooking grid lifting mechanism for a barbecue grill.

Various barbecue grills have been disclosed, and have appeared on the market. While cooking, the elevation of the cooking grid may have to be adjusted according to the intensity of fire or the nature of foods to be roasted. However, the cooking grid adjusting mechanisms of conventional barbecue grills are commonly not stable in operation. During the adjusting procedure, the cooking grid may be vibrated causing the foods scattered over the ground.

SUMMARY OF THE INVENTION

The present invention has been accomplished to eliminate the aforesaid problem. It is one object of the present invention to provide a cooking grid lifting mechanism for a barbecue grill which can be conveniently operated to smoothly lift or lower down the cooking grid. It is another object of the present invention to provide a barbecue grill which is easy to assemble. According to one aspect of the present invention, the lifting mechanism comprises a transmission rod having two reversed worms and driven by a heat-insulative crank handle, two driven gear wheels respectively meshed with the reversed worms and having a respective coupling hole at the center, and two links having each one end pivoted to either side of the cooking grid and an opposite end fixedly fastened to the coupling hole of either gear wheel. According to another aspect of the present invention, two guide 10 tracks are vertically bilaterally disposed on the grill body at the top to guide the vertical movement of the cooking grid.

DETAILED DESCRIPTION OF THE PREFERRED EMBODIMENT

Figure 1:
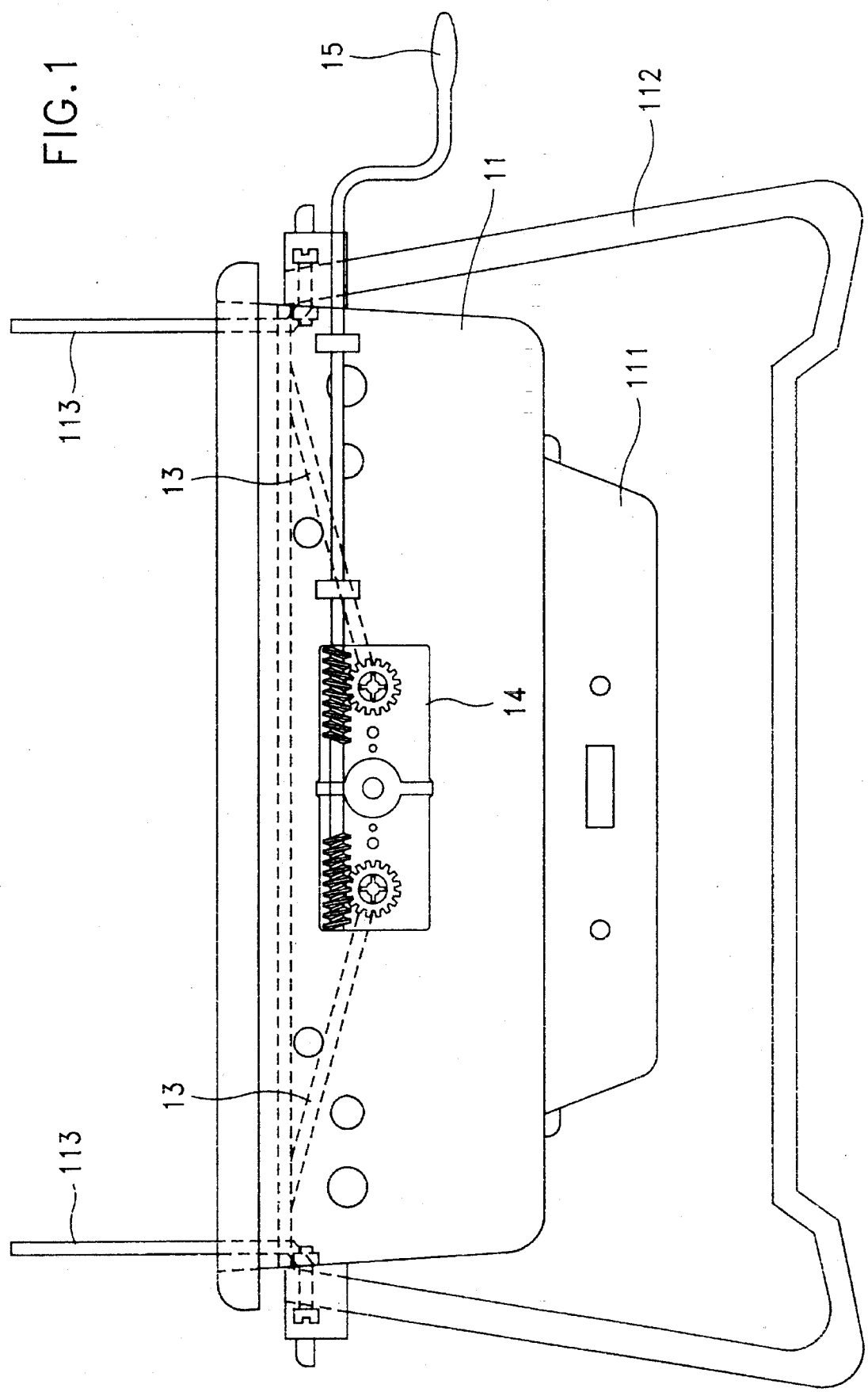
FIG. 1 shows a barbecue grill according to the present invention.
Figure 2:
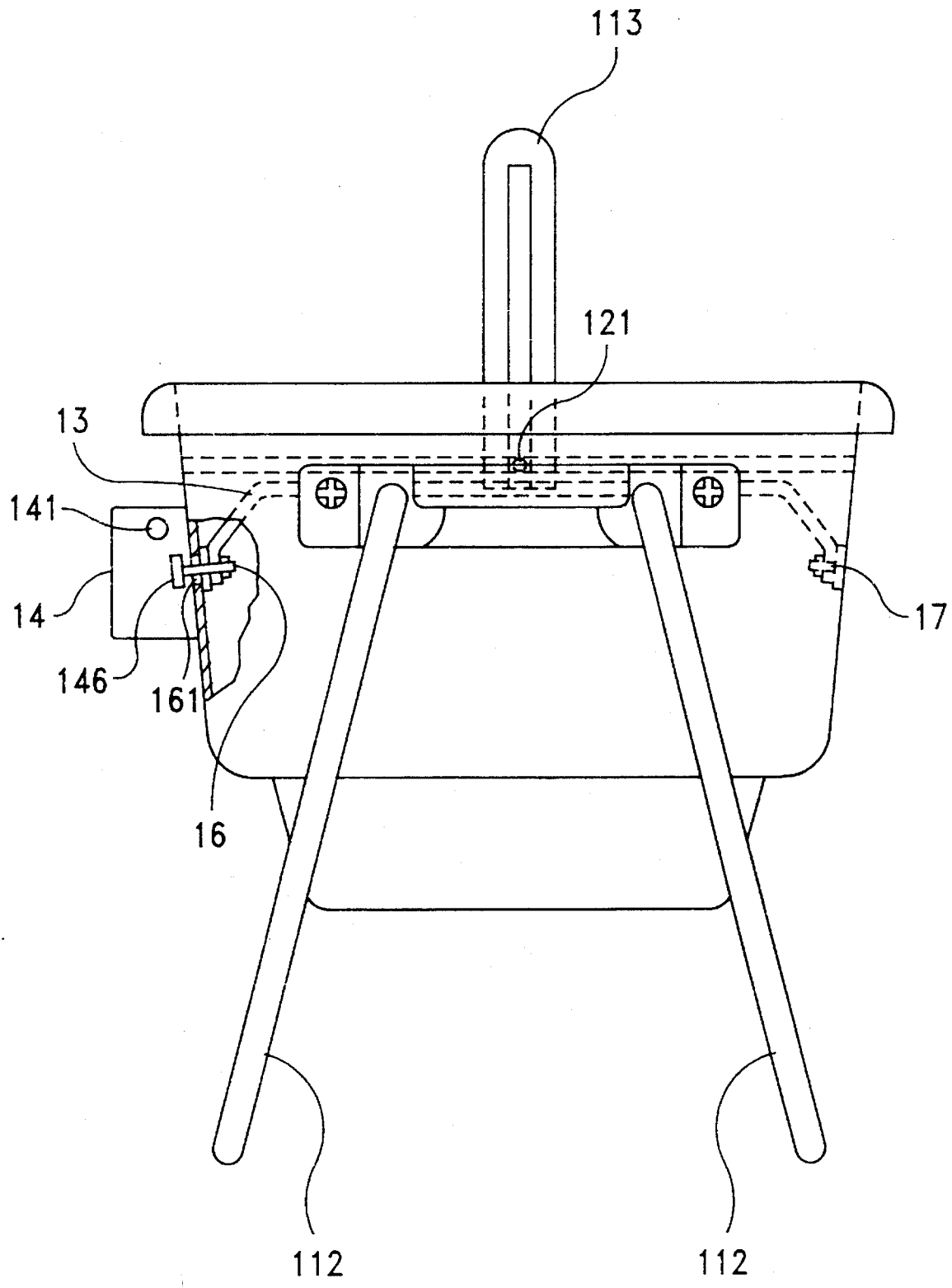
FIG. 2 is a side view of the barbecue grill shown in FIG. 1.
Figure 3:
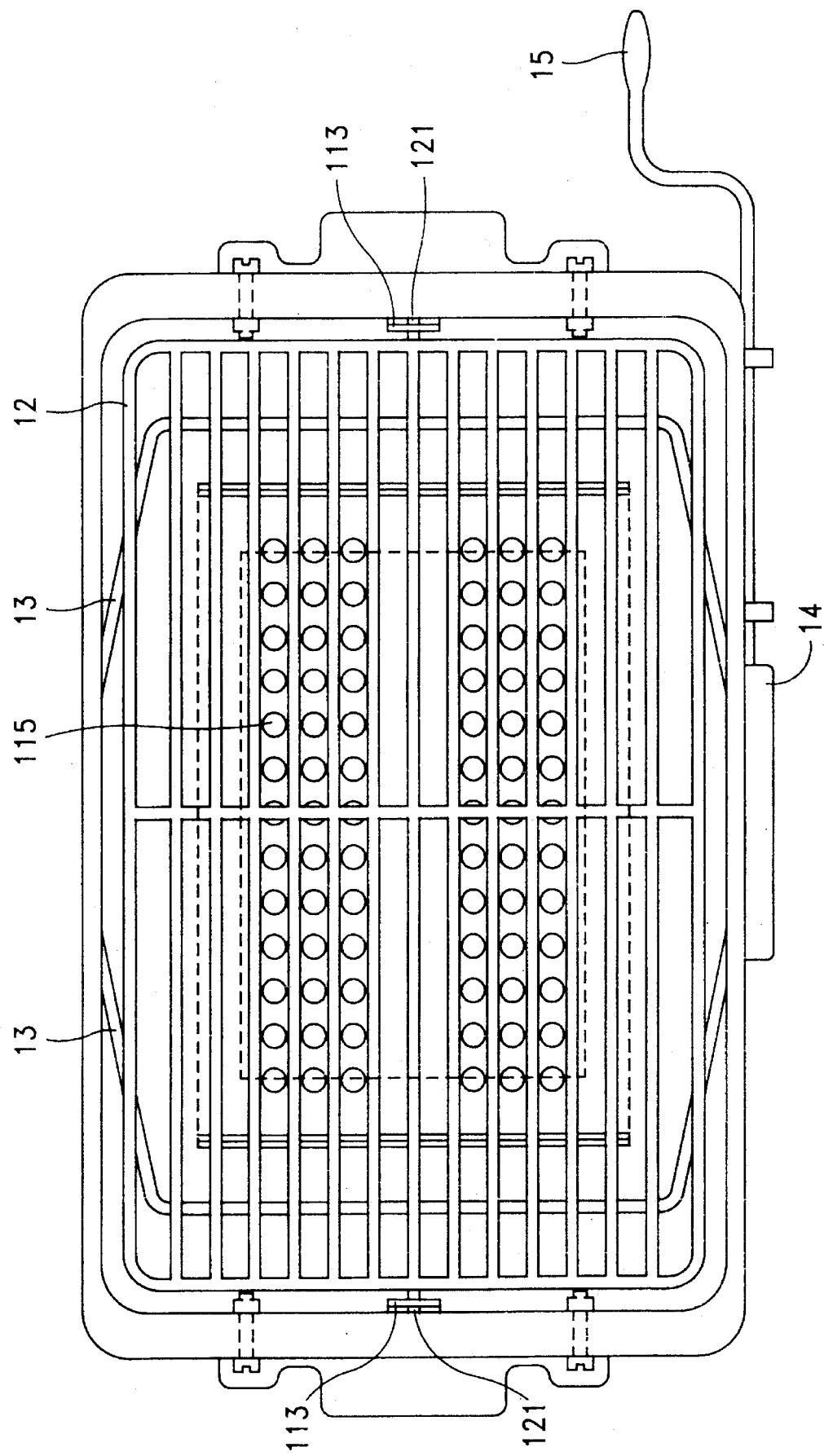
FIG. 3 is a top view of the barbecue grill shown in FIG. 1.
Figure 4:
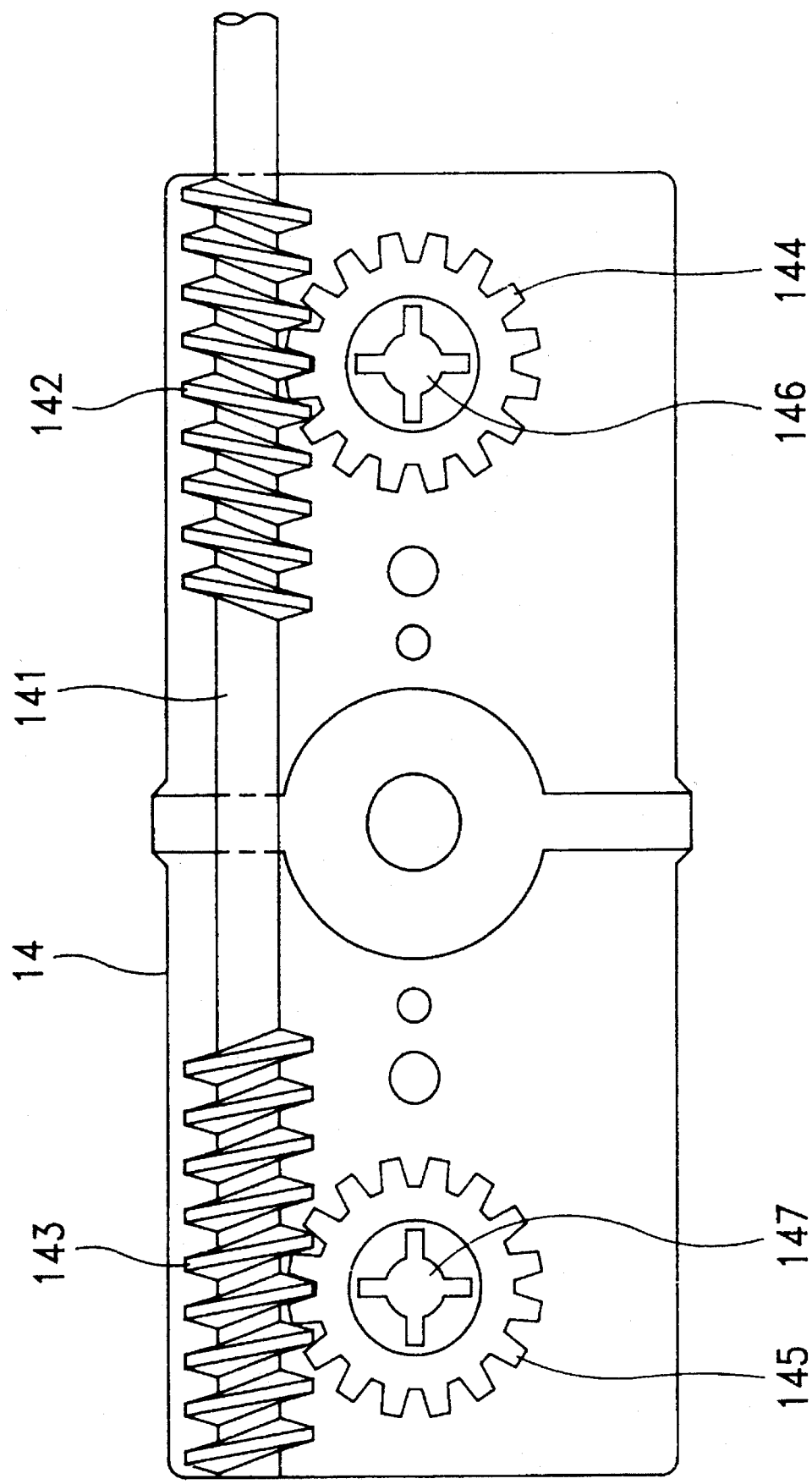
FIG. 4 is a plain view in enlarged scale of the lifting mechanism for the barbecue grill shown in FIG. 1.

Referring to FIGS. 1, 2, and 3, a barbecue grill according to the present invention comprises a grill body 11 supported on two stands 112 and having a trapezoidal bottom casing 111, two upright guide tracks 113 upstanding from the grill body 11 at two opposite sides, a cooking grid 12 placed on the grill body 11 at the top and having two rods 121 longitudinally aligned at two opposite sides and respectively inserted into the upright guide tracks 113 and moved vertically along the upright guide tracks 113, a lifting mechanism 14 mounted on an outside to a longitudinal side wall of the grill body 11, two "U" shaped pivotable links 13 laid under the cooking grid 12 each having one end fastened to a square headed pivot 16 on an inside of a longitudinal side wall of grill body 11 and an opposite end pivoted to a simple pivot 17 on an inside of an opposite side wall of grill body 11. Referring to FIG. 4 the lifting mechanism 14 comprising a transmission rod 141 having two reversed worms 142 and 143, a heat-insulative crank handle 15 coupled to the transmission rod 141 at one end for turning the transmission rod 141 in either direction, two worm gears 144 and 145 respectively meshed with the worms 142 and 143 and having a respective coupling 146 or 147 to which either pivot 16 is coupled through a through hole 161 (see FIG. 2) on a side wall of the grill body 11.

Figure 5:
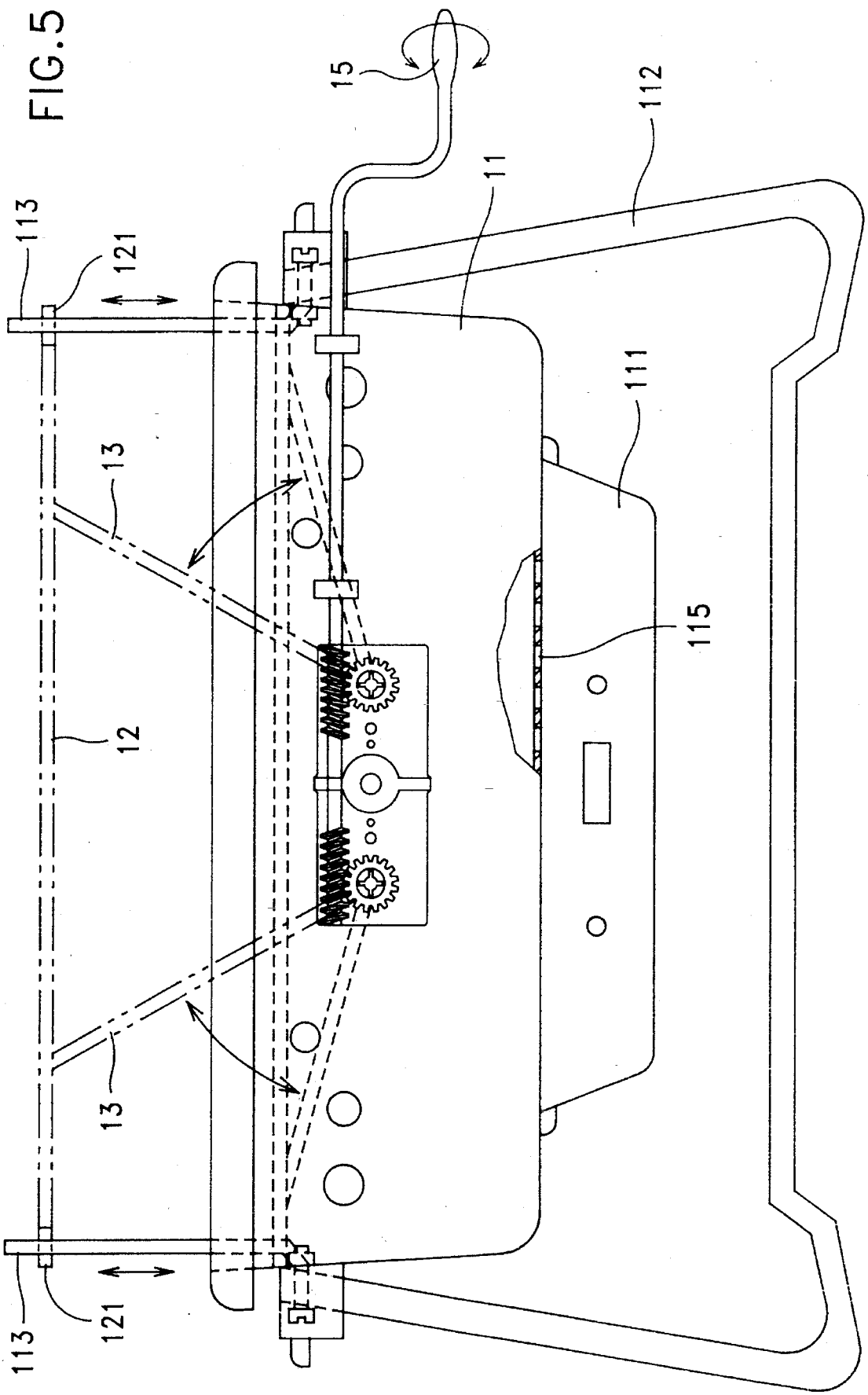
FIG. 5 is similar to FIG. 1 but showing the crank handle turned and the cooking grid lifted.

Referring to FIG. 5, when the crank handle 15 is turned, the worms 142 and 143 are driven to turn two worm gears 144 and 145 in reversed direction causing the links 13 turned synchronously to the vertical position or the horizontal position, and therefore the cooking grid 12 is lifted up or lowered down.

Referring to FIGS. 3 and 5, the grill body 11 has a plurality of holes 115 on the bottom wall thereof communicated with the holding space of the bottom casing 111. Ashes left after burning can therefore be collected in the bottom casing 111 without polluting the environment.

What is claimed is:

1. A barbecue grill comprising a grill body supported on two stands and having a trapezoidal bottom casing for collecting ashes, a cooking grid placed on said grill body at a top, and a lifting mechanism controlled to move said cooking grid vertically above said grill body, wherein said lifting mechanism comprises a transmission rod having two reversed worms, two worm gears respectively meshed with said reversed worms and having a respective coupling at a center, and two links each having one end fixedly fastened to said coupling of either worm gear and an opposite end pivoted to either side of said cooking grid respectively.

2. The barbecue grill of claim 1 wherein said grill body comprises two upright guide tracks bilaterally disposed at a top; said cooking grid has two sliding rods longitudinally horizontally aligned at opposite sides and respectively moved along said upright guide tracks.

3. The barbecue grill of claim 1 wherein said transmission rod has one end coupled with a heat-insulative crank handle.

* * * * *